March 24, 1970
L. L. SPILLER
3,502,492
METAL SUBSTRATE COATED WITH EPOXY POWDER PRIMER AND
PLASTICIZED POLYVINYL CHLORIDE TOPCOAT
AND METHOD OF MAKING SAME
Filed Dec. 13, 1965
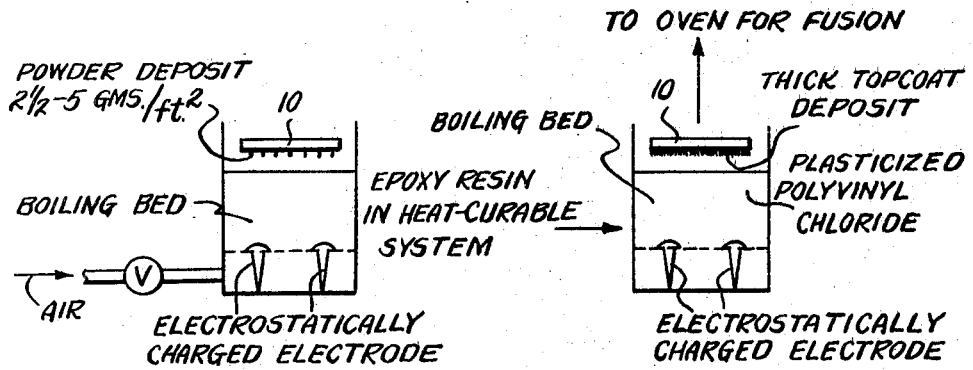
Fig.1.
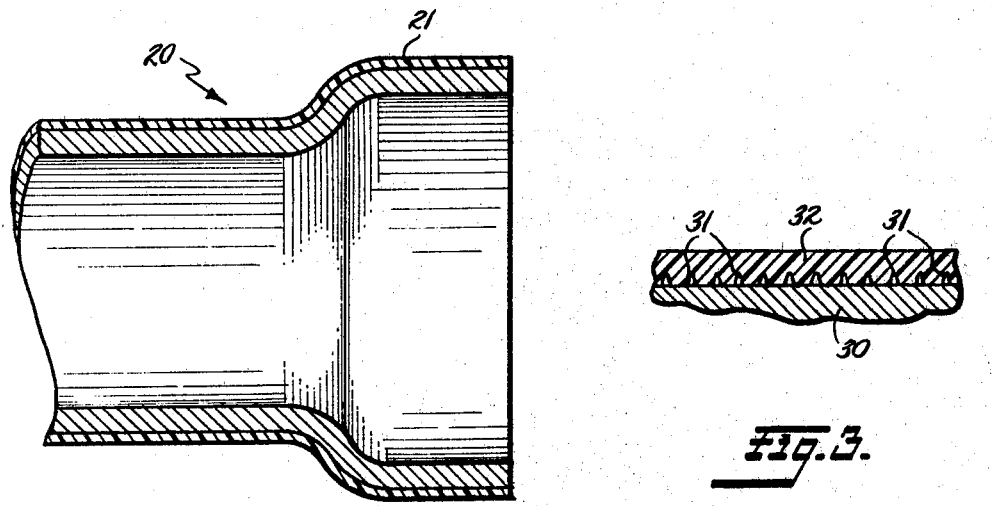
Fig.2.
Fig.3.
INVENTOR
LESTER L. SPILLER
BY Arnold J. Gulko
ATTORNEY

United States Patent Office 3,502,492
Patented Mar. 24, 1970

3,502,492
METAL SUBSTRATE COATED WITH EPOXY POWDER PRIMER AND PLASTICIZED POLYVINYL CHLORIDE TOPCOAT AND METHOD OF MAKING SAME
Lester L. Spiller, Indianapolis, Ind., assignor to Ransburg Electro-Coating Corp., Indianapolis, Ind., a corporation of Indiana
Filed Dec. 13, 1965, Ser. No. 513,295
Int. Cl. B44d 1/094, 1/44
U.S. Cl. 117—17    12 Claims

ABSTRACT OF THE DISCLOSURE

Metal substrates are provided with adherent polyvinyl chloride topcoats by electrostatically depositing from 2.5–5.5 grams per square foot of finely divided particles of epoxy resin in a heat-curable system on the substrate. The substrate with the epoxy particles adhered thereto then has electrostatically deposited thereover finely divided particles of plasticized polyvinyl chloride in a heavy layer and the substrate, with both particles electrostatically adhered thereto is then heated to simultaneously coalesce all of the particles and provide a layer of plasticized polyvinyl chloride adherently associated with the substrate by means of the epoxy particles.

---

The present invention relates to the coating of metal surfaces with plasticized polyvinyl chloride in powder form and particularly to the priming of the metal surface with epoxy resin in powder form in a manner providing greatly improved adhesion to the metal substrate without excessive impairment of the flexibility of the polyvinyl chloride coating. The invention includes a method of depositing the plasticized polyvinyl chloride powder in order to provide a strongly adhered coating using a single baking operation.

Plasticized polyvinyl chloride is of outstanding value in the formation of heavy coatings on metal substrates for the reason that polyvinyl chloride possesses outstanding properties of chemical inertness and physical and toughness and for the further reason that polyvinyl chloride is an inexpensive material making it economically feasible and, indeed, desirable, to use large quantities of it in the protection of metal objects typified by metal pipes which are subjected to considerable impact and abrasive force, as are encountered in the installation of the pipe, and which are also subject to corrosive influences, as when the pipe is buried in the ground.

Unfortunately, polyvinyl chloride in power or plastisol form does not adhere well to metal surfaces and it is necessary to either employ a primer or completely replace the polyvinyl chloride with some other far more expensive resin.

While numerous primers are known, these must be applied as a solution coating composition and cured in a separate operation before the plasticized polyvinyl chloride can be deposited and fused to complete the coating operation, representing an obviously arduous and expensive preliminary operation.

In accordance with the invention, it has been found that epoxy resin in powder form and in a heat-curable system, will provide an excellent priming effect for polyvinyl chloride in powder form if a small quantity thereof, insufficient to fully cover the metal surface, is deposited before the polyvinyl chloride powder, and the two powders are then coalesced and fused to the metal surface in a single baking operation.

The objective is to apply a light dusting of epoxy powder to the underlying substrate and then, before baking, to apply a thick layer of polyvinyl chloride powder. In this way, both the epoxy powder and the polyvinyl chloride powder are adhered to one another and to the underlying substrate at the same time. As a result, the epoxy powder is forced to function before it can flow out to create a continuous epoxy-polyvinyl chloride interface and to provide a simultaneous bond to the underlying substrate and to the interspersed polyvinyl chloride particles while the oxirane reactivity of the epoxy powder is still available.

In order to provide at least some significant improvement in adhesion, it is desirable to apply the epoxy primer in an amount of at least 2½ grams per square foot of surface. If less than this is used, the improvement in adhesion is not great enough for practical value. On the other hand, and when more than 5 grams per square foot of surface is used, insufficient metal surface remains exposed and, as a result, the polyvinyl chloride powder is unable to get between the particles of epoxy powder to provide the results which are desired in accordance with the invention. Instead, the physical arrangement is sufficiently changed so that the finished polyvinyl chloride coating is brittle and it is too easily removed by impact or abrasive force.

Referring more particularly to the epoxy materials which are used in accordance with the invention, these may be constituted by any resinous polyepoxide, preferably those having a 1,2-epoxy equivalency of at least 1.4. Particularly preferred are the polyglycidyl ethers of polyhydric aromatic compounds, especially bisphenols in which a pair of phenolic groups is joined together through an intervening alkylene group. Especially preferred are the diglycidyl ethers of bisphenols such as bisphenol A which have an average molecular weight in the range of from 350 to 2000.

While the aromatic polyepoxides are preferred, aliphatic polyepoxides such as polyglycidyl ethers of ethylene glycol or butylene glycol, or even higher functional alcohols such as glycerin, pentaerythritol or trimethylol propane may be employed.

Also, and while the glycidyl group constitutes the preferred oxirane-containing group, there are innumerable polyepoxides in which the 1,2-epoxy group is present, in some other form, and these are well known and may be used to the extent that they are available in solid form.

As previously indicated, the epoxy materials are used in powder form and in a heat-curable system. Epoxy resins as described are by themselves permanently thermoplastic and ordinarily require the addition of cross-linking agents or other reactive materials before they can be cured to hard, infusible resinous products. The chemical hardening agents may react with the epoxy resins at their epoxy groups or the reaction may involve the hydroxyl groups, or both. A number of chemical hardening agents for epoxy resins are known including organic acid anhydrides such as maleic, pyromellitic, phthalic or hexahydrophthalic anhydride; amines, such as diethylamine or diethylene triamine; and other agents including diisocyanates, urea-formaldehyde resins, dicyandiamide, glyoxal, aromatic polysulfonic acids, etc. Because the reaction between the epoxy resin and the hardening agent may proceed rather slowly, small amounts of activators are sometimes included in the reactive composition, for example, alkali phenoxides, Friedel-Crafts type catalysts, and various amines, particularly tertiary amines.

The chemical hardening agents are generally used in amounts equivalent to the free epoxy groups in the epoxy resin. Where the resin contains hydroxyl groups which enter into the reaction, curing may be effected with somewhat lesser amounts, although usually with some decrease in the strength of the resulting cured resinous product.

The curing systems which are particularly preferred are the thermosetting epoxy compositions in which the epoxy resin or resins are softened on a mill and then mixed with appropriate catalysts, hardeners, and desired pigments and fillers. After thorough mixing is completed, the mixture is cooled to prevent the reaction from running away and then sheeted off and ground to a fine particle size for use. In this way, the various components of the heat-curable epoxy system are supplied from a homogeneous material in which each particle contains all of the components of the mix.

The preferred curing agents in the homogeneous systems are polyamines, polycarboxylic polyhydrazides, isophthalyl dihydrazide being especially preferred. In addition to dihydrazide hardeners, many other hardeners can be used as reactants with epoxy resins to give an insoluble and infusible thermoset mass. Chlorendic anhydride (melts at about 460° F.) is but illustrative of many anhydrides useful as latent heat-activated epoxy-reactive hardeners. Catalysts or accelerators are used to further increase the rate of reaction between the hardener and epoxy resin. Generally, tertiary amines and their acid salts have proved to be especially effective to increase the rate of cure of the preferred compositions at elevated temperatures, and yet not unduly affect the stability of the composition when retained at room temperature or below. Suitable catalysts are illustrated by dicyandiamide, α-methylbenzyldimethylamine, acid salts of tris(dimethylaminomethyl) phenol, diethylaminopropylphthalimide, as well as the salicylic acid salt thereof, etc.

While the premixed system is preferred and requires a relatively stable system for best results, the invention is not limited to the use of mixtures or to the achievement of good shelf stability. Single phase epoxy-hardening agent mixtures are well known and illustrated, for example, in U.S. Patent No. 3,214,403.

From the standpoint of particle size, the epoxy resin should be used in finely divided form, an average particle size of about 100 mesh being an approximate maximum. Preferably, the average particle size should be about 200 mesh, still more preferably about 300 mesh. On the other hand, the epoxy resin particles must have at least some significant size in order to be applied so an appropriate lower limit of particle size is definable by reference to the production of fluid beds in which the particles must have at least sufficient size to avoid being entrained and carried away in order to form a fluid bed. It follows that the particle must have at least sufficient size to be fluidizable.

The polyvinyl chloride powder should generally have the same size as the epoxy resin powder, but somewhat larger sizes can be tolerated up to about 250 microns.

In accordance with the invention, it is essential that the polyvinyl chloride powder and the epoxy powder be coalesced at the same time. If the epoxy powder is applied first and then baked to cause it to flow out and form a film, the benefits of the invention are significantly reduced both from the standpoint that production is made more complex and also from the standpoint that adhesion is reduced. Accordingly, it is necessary that heating sufficient to coalesce the resin particles be deferred until after the epoxy powder has been deposited and the polyvinyl chloride powder deposited thereover. In order that this might be done, the respective powder coatings of the invention are applied by electrostatic means so that the residual electrostatic force may be relied upon to retain both the epoxy powder and the polyvinyl chloride powder in position on the underlying substrate until such time that the substrate with the powder coatings adhered thereto can be subjected to heat to cause the resin particles to coalesce and form the desired film.

Further, it is essential, as previously explained, to apply the epoxy powder in an extremely thin layer insufficient to cover the surface of the metal substrate. Such a result is not achievable by merely submerging a grounded metal object in a boiling bed of electrostatically charged particles because too many particles come into immediate contact with the metal object so that the surface of the object is instantly covered with adherent particles which would defeat the present invention.

In contrast, and in the invention, electrostatically charged particles are projected into the vicinity of the grounded metal object, but not into direct contact therewith, and the electrostatic charge is permitted to carry only a few of the particles into the vicinity of the metal object to deposit thereupon slowly and progressively. In this way, the desired thin layers are formed in which large portions of the metal substrate are not covered by the epoxy resin particles.

The foregoing is easily accomplished by projecting the electrostatically charged particles from a gun toward the object to be coated but not directly against it so that the bulk of the charged particles pass by the target without adhering thereto. Another technique is to position the object to be coated above a fluid bed of electrostatically charged particles in boiling condition, the bulk of the particles remaining in the bed and only some of them being electrostatically transported from the bed to the target object.

After the epoxy resin particles have been deposited and the polyvinyl chloride particles have been deposited thereover, both of the particles are simultaneously coalesced by subjecting the coated base to elevated temperature, the fusing temperatures being well known to the art and lying generally in the range of 400–600° F.

While the invention is broadly directed to the coating of any metal substrate, the coating of iron substrates, especially iron pipe intended to resist underground corrosion, is particularly contemplated.

The invention is illustrated in the accompanying drawings in which:

FIG. 1 is a diagrammatic flow sheet indicating the steps which are followed in the production of a coated structure in accordance with the invention;

FIG. 2 shows a cross-section of a pipe coated in accordance with the invention; and FIG. 3 is a cross-section on a greatly enlarged scale and showing a portion of the coated surface in a diagrammatic manner to illustrate what is believed to occur in accordance with the invention.

Referring more particularly to FIG. 1, it will be seen that a metal panel 10 has been positioned above the upper surface of a boiling bed of particles of epoxy resin in a heat-curable system, these particles being electrostatically charged so that some of the particles will be electrostatically transported from the boiling bed to deposit on the panel 10. The time of deposition is regulated to deposit the desired thin layer containing 2½–5 grams per square foot. The panel 10, primed as indicated, is then transferred to a second deposition zone constituted by another electrostatically charged boiling bed in which the particles are plasticized polyvinyl chloride particles. This time, sufficient charge is employed and sufficient time is utilized to deposit a thick layer to provide the desired protection for the panel and to provide, at the surface of the panel, a situation in which particles of epoxy resin are surrounded by particles of plasticized polyvinyl chloride. The panel with the primer deposit and the thick topcoat deposit thereon, both in powder form, is then conveyed to an oven where it is baked to fuse the particles and provide a flexible coating which is strongly adhered to the underlying substrate.

Referring to FIG. 2, there is pictured a pipe 20 made of iron and having its exterior surface coated with a thick layer of polyvinyl chloride coating 21, this coating being adhered to the base by means of the separated discrete particles of epoxy primer which are not visible in the figure.

Referring to FIG. 3, which illustrates the final product in its cured condition, it will be seen that particles of epoxy primer 31 are adhered to the base 30 at the exposed surface thereof, these particles 31 being embedded in a heavy layer of coalesced polyvinyl chloride particles 32 which form a continuous layer.

The invention is illustrated in the examples which follow.

EXAMPLE 1

The epoxy primer material utilized is produced as follows:

295.7 parts of "Epon 1001" and 295.7 parts of "Epon 1002" are softened and banded on a warm two-roll rubber mill at a minimum elevated temperature, e.g., about 180° F. Then 2.3 parts of tris(dimethylaminomethyl) phenol are blended in the mass of resin on the mill. Next, about 5.3 parts of alkyl ammonium bentonite ("Bentone–38"), about 350 parts of finely divided mica filler, and about 10 parts of chrome oxide pigment are added and mixing continued on the two-roll rubber mill until a blend is obtained. About 51 parts of isophthalyl dihydrazide (epoxy resin hardner melting at about 420° F.) are then added slowly to the mill and blended with the other ingredients. Then 10 parts of dicyandiamide, are added and blended in the mass on the mill. The total time on the rubber mill for forming this mixture need not exceed about 23 minutes. It is preferable to accomplish the foregoing as rapidly as possible to minimize reaction between the components. After about 23 minutes on the mill, Dry Ice is added to lower the temperature of the composition; and it is then sheeted off, further cooled and ground to have the following particle size.

| Percent: | Particle size, mesh screen (failed to pass) |
|---|---|
| ½ to 1 | 100 |
| 5 | 140 |
| 10 | 200 |
| 8 | 230 |
| 5 | 325 |

Remainder passed through 325 mesh screen.

While two commercially available epoxy resins have been illustrated in the above example, it will be understood that a variety of epoxy resins may be used as the base for the epoxy primer material in accordance with the present invention. Thus, epoxy resins are well known and the preferred resins generally consist of the reaction product of Bisphenol A and epichlorohydrin, the reaction being carried out under alkaline conditions. Thus, "Epon 1001" is merely illustrative of one such resin, having an epoxy equivalency of 425–550, and a Durrans' mercury method melting point of about 70° C. "Epon 1002" is an analogous epoxy resin having an epoxy equivalency of 550–700, and a Durrans' mercury method melting range of 75–85° C.

The topcoat material utilized is dispersion grade polyvinyl chloride powder plasticized with a 50/50 weight ratio mixture of dioctyl phthalate and dioctyl sebacate by mixing the two together until the plasticizer is absorbed onto the resin powder whereupon the resin takes upon the properties of a dry solid. This solid is extruded, sheeted, chipped and ground to the desired size at low temperature using liquid nitrogen for cooling purposes. Preferably, the product is ground to have an average particle size in the range of from 140–200 mesh. The proportion of plasticizer is regulated to provide a fusion index of 450° F.

3" x 5" 24 gauge sheet of cold rolled phosphate treated metal is positioned about 3 inches above the upper surface of a boiling fluid bed of the epoxy powder referred to hereinbefore and the epoxy powder is then charged to 20 kv. which charge is maintained for 3 seconds. In this way there is deposited on the sheet 0.3 gram of epoxy powder to provide a deposit weighing 2.88 grams per square foot. The surface of the sheet facing the bed is not completely covered with powder and a good portion of the metal substrate can be easily seen. The sheet with the epoxy powder electrostatically adhering thereto is then placed about 3 inches above the upper surface of another fluid bed, this time containing the plasticized polyvinyl chloride powder referred to hereinbefore. This second fluid bed is then charged to 40 k.v. and the charge is maintained for 5 seconds to deposit 4 grams of the plasticized polyvinyl chloride powder on the sheet.

Almost all of the powder deposited lands on the side of the sheet facing the boiling bed and the small amount deposited on the backside of the sheet is ignored.

In the manner described above, a total deposition of 38.4 grams per square foot is applied and the deposited powder is cured in a heated oven at 470° F. for 3.5 minutes to provide an adherent coating 28 mils in thickness. This coating is strongly adherent to the metal substrate as evidenced by making parallel cuts ½ to ¼" apart in the coating outward to the edge of the sample. The film is then cut between the slits at the edge and the film is lifted with the fingers and pulled upwardly and inwardly away from the edge. In the present example, excellent adhesion is observed and the film split and did not pull away from the base. Thus, delamination occurred within the film and not in the film substrate interface.

EXAMPLE 2

Example 1 is repeated using the following commercially avialable materials as the primer coat and topcoat, Approximately the same results are obtained as in respectively: "Scotch Kote 101"; and "Corvel VCB1325." Approximately the same results are obtained as in Example 1.

EXAMPLE 3

Example 1 is repeated without any application of primer. When the adhesion test referred to is attempted, the film is easily pulled away from the base, demonstrating very poor adhesion.

The various powder coatings can be pigmented as desired, chromate pigments being especially contemplated for corrosion protection.

The invention is defined in the claims which follow.

I claim:

1. A method of adherently coating a metal substrate with a heavy layer of plasticized polyvinyl chloride comprising electrostatically depositing on said metal substrate from 2½–5 grams per square foot of finely divided particles of powdered epoxy resin in a heat-curable system, then depositing over said epoxy resin particles, a heavy layer of finely divided particles of plasticized polyvinyl chloride powder, and then simultaneously heating said epoxy resin particles and said polyvinyl chloride particles on said substrate to coalesce said particles and form a continuous layer of polyvinyl chloride strongly adhered to said substrate.

2. A method as recited in claim 1 in which said epoxy resin particles and said polyvinyl chloride particles are fluidizable particles having an average particle size of less than about 100 mesh.

3. A method as recited in claim 1 in which said polyvinyl chloride particles are electrostatically deposited over said epoxy resin particles.

4. A method as recited in claim 1 in which said heat-curable epoxy resin system is present as a homogeneous material in which each particle contains all of the components of the system.

5. A method as recited in claim 1 in which said epoxy resin is a polyglycidyl ether having a 1,2-epoxy equivalency of at least 1.4.

6. A method as recited in claim 5 in which said epoxy resin system includes a polycarboxylic polyhydrazide.

7. An article of manufacture comprising
a metal substrate,
discrete epoxy resin particles adhered to portions of the metal substrate, and a substantially continuous layer of polyvinyl chloride overlaying and coalesced with the epoxy resin particles and adhered to the metal substrate.

8. The article of manufacture of claim 7 in which said metal substrate is iron.

9. The article of manufacture of claim 7 in which said metal substrate is iron pipe having its exterior coated.

10. A method of adherently coating a metal substrate with a layer of plasticized polyvinyl chloride comprising providing a metal substrate having a surface randomly covered with finely divided particles of a powered epoxy resin in a heat-curable system so that portions of the metal surface are exposed, applying over the powdered epoxy resin particles, a layer of finely divided particles of plasticized polyvinyl chloride powder in an amount sufficient to cover the powdered epoxy resin and the exposed surfaces of the substrate, and heating the epoxy resin particles and the polyvinyl chloride particles on the substrate to cause the particles to coalesce and provide a substantially continuous layer of polyvinyl chloride adhered to the epoxy resin particles and to the substrate.

11. The method of claim 10, wherein the epoxy resin particles are electrostatically deposited.

12. The method of claim 11, wherein the epoxy resin particles have an average particle size of up to about 100 mesh.

References Cited

UNITED STATES PATENTS

| | | | |
|---|---|---|---|
| 2,877,922 | 3/1959 | Cristoforo | 117—75 X |
| 3,008,848 | 11/1961 | Annonio | 117—75 X |
| 3,019,126 | 1/1962 | Bartholomew | 117—21 X |
| 3,023,124 | 2/1962 | Cryderman et al. | 117—75 X |
| 3,035,939 | 5/1962 | Edwards | 117—75 |
| 3,102,043 | 8/1963 | Winthrop et al. | 117—21 |
| 3,102,823 | 9/1963 | Manasia et al. | 117—21 |
| 3,140,195 | 7/1964 | Nagel | 117—26 X |
| 3,214,403 | 10/1965 | Peerman | 117—21 X |
| 3,248,253 | 4/1966 | Barford et al. | 117—21 X |
| 3,177,090 | 4/1965 | Bayes et al. | 117—21 X |
| 3,264,131 | 8/1966 | Nagel | 117—21 |

WILLIAM D. MARTIN, Primary Examiner

U.S. Cl. X.R.

117—18, 21, 75, 94